(12) United States Patent
Kawakami et al.

(10) Patent No.: US 11,709,872 B2
(45) Date of Patent: Jul. 25, 2023

(54) COMPUTER-READABLE RECORDING MEDIUM STORING RESPONSE PROCESSING PROGRAM, RESPONSE PROCESSING METHOD, AND INFORMATION PROCESSING APPARATUS

(71) Applicant: FUJITSU LIMITED, Kawasaki (JP)

(72) Inventors: Shinichi Kawakami, Chiba (JP); Masaki Ohashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/500,052

(22) Filed: Oct. 13, 2021

(65) Prior Publication Data

US 2022/0035849 A1 Feb. 3, 2022

Related U.S. Application Data

(63) Continuation of application No. PCT/JP2019/021434, filed on May 29, 2019.

(51) Int. Cl.
| | | |
|---|---|---|
| *G06F 16/332* | (2019.01) | |
| *G06F 16/34* | (2019.01) | |
| *G06F 16/35* | (2019.01) | |
| *G06F 16/33* | (2019.01) | |
| *G06F 16/338* | (2019.01) | |

(52) U.S. Cl.
CPC ........ *G06F 16/3329* (2019.01); *G06F 16/338* (2019.01); *G06F 16/3326* (2019.01); *G06F 16/3344* (2019.01); *G06F 16/34* (2019.01); *G06F 16/35* (2019.01)

(58) Field of Classification Search
CPC .................................................. G06F 16/3329
See application file for complete search history.

(56) References Cited

U.S. PATENT DOCUMENTS

| | | | |
|---|---|---|---|
| 10,741,185 B2 * | 8/2020 | Gruber | ............... G06F 16/2457 |
| 2017/0242915 A1 | 8/2017 | Torisawa et al. | |
| 2020/0372055 A1 * | 11/2020 | Joko | ....................... G06F 40/30 |

FOREIGN PATENT DOCUMENTS

| | | |
|---|---|---|
| JP | 2003-058464 A | 2/2003 |
| JP | 2005-063158 A | 3/2005 |
| JP | 2010-009471 A | 1/2010 |

(Continued)

OTHER PUBLICATIONS

International Search Report and Written Opinion of the International Searching Authority (Form PCT/ISA/210, 220, and 237), mailed in connection with PCT/JP2019/021434 and dated Aug. 27, 2019 (Total 8 pages).

*Primary Examiner* — Van H Oberly
(74) *Attorney, Agent, or Firm* — Fujitsu Patent Center

(57) ABSTRACT

A non-transitory computer-readable recording medium stores a response processing program for causing a computer to execute processing including: receiving a question from a user input to a terminal; extracting, in a case where a plurality of pieces of answer candidate data that corresponds to the received question is retrieved, keywords or key phrases from the plurality of pieces of answer candidate data; classifying the extracted keywords or key phrases on the basis of words included in the keywords or key phrases; and outputting a classification result of the keywords or key phrases to the terminal in a state selectable by a user, together with a response text to the question.

8 Claims, 13 Drawing Sheets

(56) References Cited

FOREIGN PATENT DOCUMENTS

| | | |
|---|---|---|
| JP | 2010-271800 A | 12/2010 |
| JP | 2015-036945 A | 2/2015 |
| WO | 2016/027714 A1 | 2/2016 |

* cited by examiner

FIG. 9B

```
ADMINISTRATOR SCREEN                                  [X]

901 ── TRIP
911 ──   ARE YOU ALONE?
         OR IS THERE ANYONE ELSE?
           ├─ BY MYSELF
910 ──     ├─ IN GROUP
           └─ WITH FAMILY
921 ──   WHICH IS PURPOSE OF TRIP?
           ├─ BUSINESS TRIP
920 ──     ├─ GRADUATION TRIP
           └─ SIGHTSEEING TRIP
931 ──   WHICH IS YOUR DESTINATION?
           ├─ ASIA
930 ──     ├─ NORTH AMERICA
           └─ HOT SPRING
941 ──   WHICH VEHICLE DO YOU USE FOR MOVING?
           ├─ INEXPENSIVE SHIP
           ├─ INEXPENSIVE AIRPLANE
           ├─ INEXPENSIVE AIRPLANE OR
           │  EXPENSIVE SHIP
           ├─ SHINKANSEN
940 ──     ├─ SHIP
           ├─ AIRPLANE
           ├─ EXPENSIVE SHIP
           └─ EXPENSIVE AIRPLANE
```

900

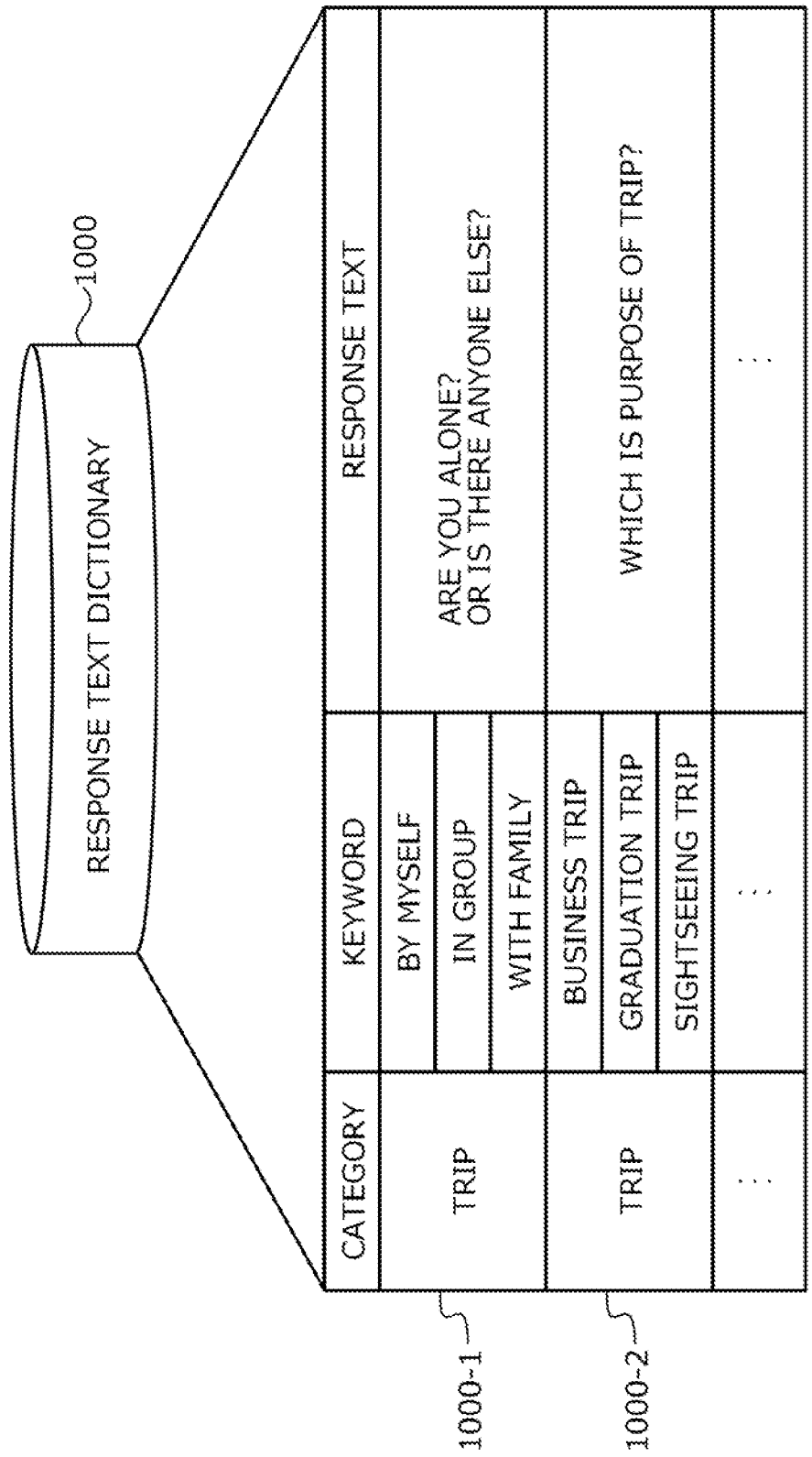

COMPUTER-READABLE RECORDING MEDIUM STORING RESPONSE PROCESSING PROGRAM, RESPONSE PROCESSING METHOD, AND INFORMATION PROCESSING APPARATUS

CROSS-REFERENCE TO RELATED APPLICATION

This application is a continuation application of International Application PCT/JP2019/021434 filed on May 29, 2019 and designated the U.S., the entire contents of which are incorporated herein by reference.

FIELD

The embodiment discussed herein is related to a response processing program, a response processing method, and an information processing apparatus.

BACKGROUND

Conventionally, a frequently asked questions (FAQ) system using a chat-type screen has been used. For example, there is a FAQ system that stores a FAQ list in which a question text is associated with an answer, and when a question text is received from a user, retrieves an answer corresponding to the received question text from the FAQ list and responds to the user.

Japanese Laid-open Patent Publication No. 2005-063158 is disclosed as related art.

SUMMARY

According to an aspect of the embodiments, A non-transitory computer-readable recording medium stores a response processing program for causing a computer to execute processing including: receiving a question from a user input to a terminal; extracting, in a case where a plurality of pieces of answer candidate data that corresponds to the received question is retrieved, keywords or key phrases from the plurality of pieces of answer candidate data; classifying the extracted keywords or key phrases on the basis of words included in the keywords or key phrases; and outputting a classification result of the keywords or key phrases to the terminal in a state selectable by a user, together with a response text to the question.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9B is an explanatory diagram (part 2) illustrating a screen example of the administrator screen;

FIG. 10 is an explanatory diagram illustrating an example of storage contents of a response text dictionary 1000;

DESCRIPTION OF EMBODIMENTS

For example, there is a technology for extracting similar question messages from an analysis result of an input question text, extracting a reply message to each of the similar question messages from a message database, creating hint information to be presented to a user from an analysis result of each response message, or the like, and scoring the response message on the basis of hint information specified by the user.

However, in the prior art, in a case where a plurality of answer candidates is retrieved for the input question text, it may be difficult to narrow down the answer candidates, which may reduce convenience of the user.

In one aspect, an embodiment aims to enable narrowing down of answer candidates to a question.

Hereinafter, an embodiment of a response processing program, a response processing method, and an information processing apparatus will be described in detail with reference to the drawings.

Embodiment

Figure 1:
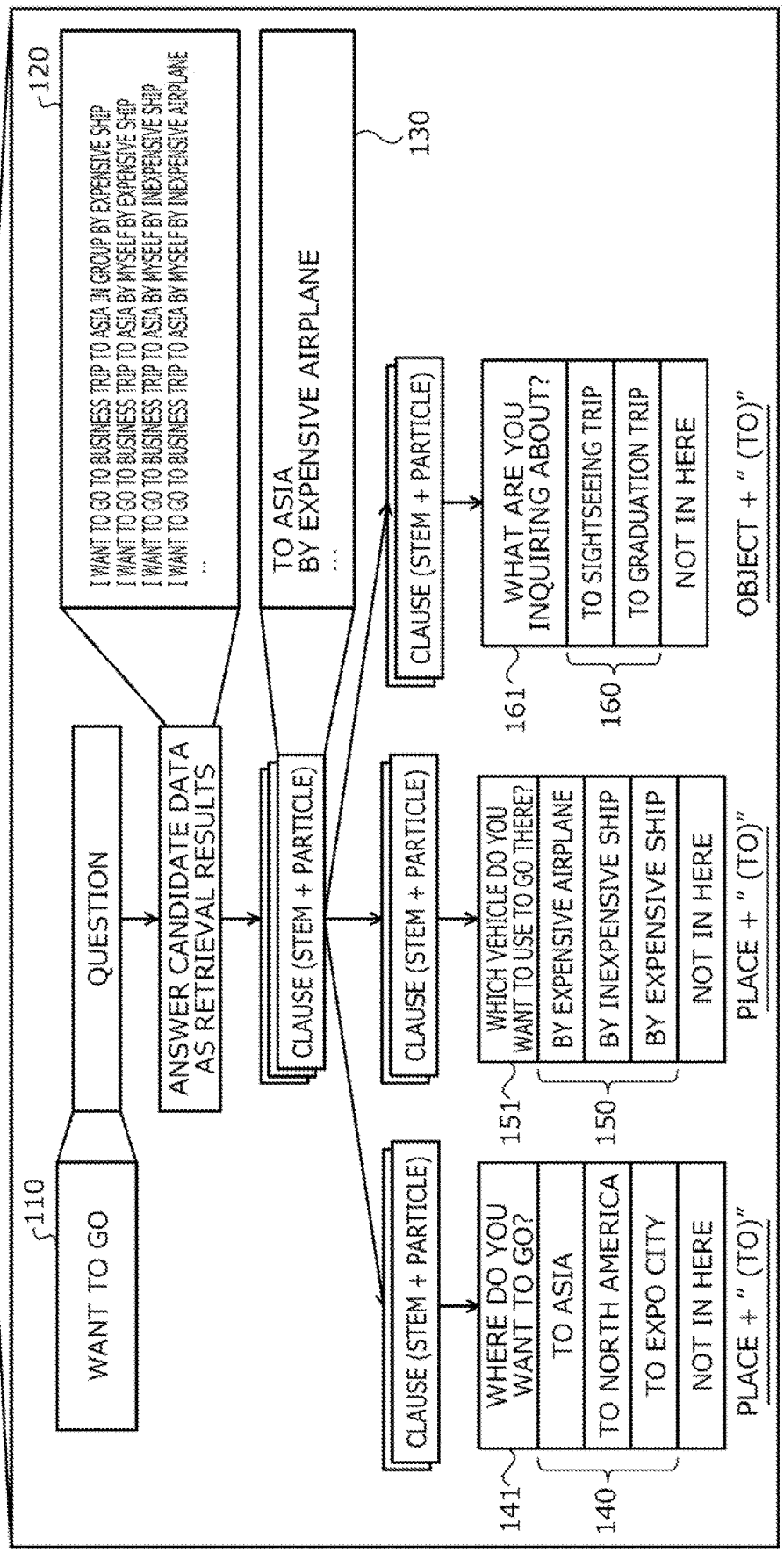
FIG. 1 is an explanatory diagram illustrating an example of a response processing method according to an embodiment.

FIG. 1 is an explanatory diagram illustrating an example of a response processing method according to an embodiment. In FIG. 1, an information processing apparatus 101 is a computer that narrows down retrieval results for question data. The question data asks for a solution method for some problem. Furthermore, the question data may be a spoken question. The question data may be expressed by a word or a combination of a plurality of words, or may be expressed by one or a plurality of sentences.

The retrieval result is answer candidate data corresponding to the question data. The answer candidate data is a candidate of an answer indicating the solution method for the inquired problem, or a candidate of an answer to the spoken question. The answer candidate data is, for example, a FAQ. The FAQ means "frequently asked questions", and is a collection of question data and answer data for the question data expected in advance.

Here, in a FAQ system using a technology called a chatbot, there is no concept of a page for retrieval results of FAQs, and the number of FAQs that may be displayed at one time is often about 3 to 5. The chatbot is a computer system that uses artificial intelligence to interact with and exchange messages with humans.

Thus, it is conceivable that, in a case where the number of retrieval results of the FAQs exceeds the maximum display number, keywords extracted from the FAQs as the retrieval results are displayed in a list, and when a user selects a keyword that is considered to be related to a question, the retrieval results, for example, answer candidates, are narrowed down on the basis of the selected keyword. In this method, the user is allowed to select a keyword until the number of the retrieval results becomes the maximum display number or less, and when the number of the retrieval results becomes the maximum display number or less, FAQs as answer candidates are displayed as retrieval results. However, there is a problem that, when the keywords displayed in the list are not relevant, it is difficult for the user to select a keyword that is considered to be related to the question.

For this reason, it is conceivable that an administrator of the chatbot makes setting in advance so that relevant keywords may be displayed in the list. For example, in response to a question "I want to make a trip", by setting keywords related to trip purposes such as sightseeing and a graduation trip as options, it is possible to clarify and present desired information for inquiry content. However, it is troublesome to determine and preset relevant keywords because it takes time and effort.

Therefore, in the present embodiment, a response processing method will be described in which, when a plurality of answer candidates for question data is narrowed down, words included in answer candidate data (for example, FAQs) are automatically classified and displayed in a selectable manner, so that the answer candidates for the question data may be narrowed down. Hereinafter, a processing example of the information processing apparatus 101 will be described.

(1) The information processing apparatus 101 receives a question from a user input to a terminal. The question is, for example, question data such as a question which asks for a solution method for some problem or a spoken question. The terminal is a computer used by the user, and is, for example, a terminal 201 illustrated in FIG. 2 described later.

In the example of FIG. 1, it is assumed that input of a question 110 is received. The question 110 is a character string "want to go".

(2) In a case where a plurality of pieces of answer candidate data corresponding to the received question is retrieved, the information processing apparatus 101 extracts keywords or key phrases from the plurality of pieces of answer candidate data. The answer candidate data is, for example, a FAQ. The key phrase is a combination of a plurality of keywords. For example, the information processing apparatus 101 analyzes contents of each of the plurality of pieces of answer candidate data on the basis of words and grammatical elements, and extracts keywords or key phrases from the plurality of pieces of answer candidate data.

The contents of the answer candidate data are, for example, contents of question data or answer data in the FAQ. The grammatical element is, for example, an element that constitutes the answer candidate data or a relationship between the elements. The grammatical element is, for example, parts of speech of words included in the FAQ or a modification relation between the words.

Here, among words included in the FAQs as the retrieval results, a difference in meanings of "nouns" often indicates a difference in what the user wants to do or know. Thus, the information processing apparatus 101 may, for example, extract keywords including a noun on the basis of parts of speech of words included in each of the plurality of pieces of answer candidate data.

Furthermore, among the words included in the FAQs as the retrieval results, a difference in "particles" attached to "nouns" often indicates a difference in what the user wants to do or know. For example, among the words included in the FAQs as the retrieval results, "noun+particle" may be said to be a key phrase indicating what the user wants to do or know. Thus, the information processing apparatus 101 may, for example, extract key phrases including a combination of a noun and a particle on the basis of parts of speech of words included in each of the plurality of pieces of answer candidate data.

In the example of FIG. 1, it is assumed that a retrieval result 120 is retrieved for the question 110. The retrieval result 120 is a set of question texts of the FAQs retrieved for the question 110. Furthermore, it is assumed that a key phrase set 130 including a combination of a noun (stem) and a particle is extracted on the basis of parts of speech of words included in each of the question texts of the FAQs of the retrieval result 120. For example, in the key phrase set 130, a keyword "to Asia" includes a combination of a noun "Asia" and a particle "to". Furthermore, a keyword "by expensive airplane" includes a combination of a noun "airplane" and a particle "by".

(3) The information processing apparatus 101 classifies the extracted keywords or key phrases on the basis of words included in the keywords or key phrases. For example, the information processing apparatus 101 may classify the extracted keywords by collecting keywords including words having the same meaning.

Furthermore, the information processing apparatus 101 may classify the extracted key phrases on the basis of meanings of nouns and types of particles included in the key phrases. For example, the information processing apparatus 101 may classify the extracted key phrases by collecting key phrases including a combination of words having the same meaning and particles of the same type.

In the example of FIG. 1, it is assumed that the key phrase set 130 is classified on the basis of a meaning of a noun and a type of a particle included in each key phrase. For example, a classification result 140 is a result of the classification based on a meaning "place" of a noun and a type of the particle "to" included in the key phrases. A classification result 150 is a result of the classification based on a meaning "object" of a noun and a type of the particle "by" included in the key phrases. A classification result 160 is a result of the classification based on the meaning "object" of a noun and the type of the particle "to" included in the key phrases.

(4) The information processing apparatus 101 outputs the classification results of the keywords or key phrases to the terminal in a state selectable by the user, together with a response text to the question. The response text to the question may be, for example, prepared in advance or created on the basis of contents of the question or the answer candidate data corresponding to the question. Note that specific content of processing when the response text is created will be described later with reference to FIG. 6.

For example, the information processing apparatus 101 displays the classification result 140 of the key phrases together with a response text 141. Furthermore, the information processing apparatus 101 may display the classification result 150 of the key phrases together with a response text 151. Furthermore, the information processing apparatus 101 may display the classification result 160 of the key phrases together with a response text 161.

In this way, according to the information processing apparatus 101, the keywords or key phrases extracted by analyzing the contents of the answer candidate data as the retrieval results may be automatically classified and presented to the user as options. Therefore, for example, in a case where there is a plurality of pieces of answer candidate data, it is possible to narrow down the answer candidates by presenting keywords or key phrases corresponding to each classification of the answer candidate data to the user and receiving selection.

(System Configuration Example of Response Processing System 200)

Next, a system configuration example of a response processing system 200 including the information processing apparatus 101 illustrated in FIG. 1 will be described. The response processing system 200 is applied to, for example, a FAQ system using a chatbot.

Figure 2:
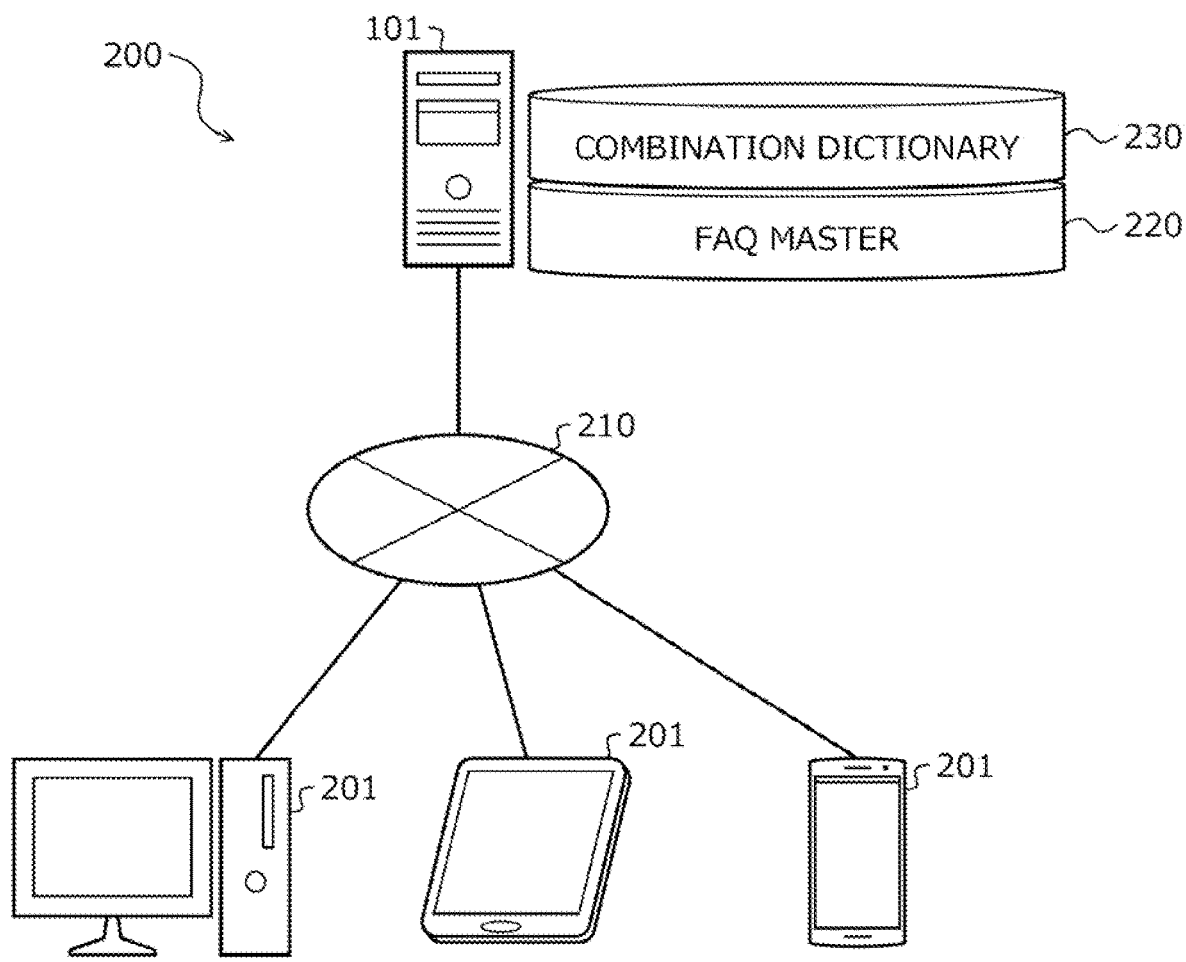
FIG. 2 is an explanatory diagram illustrating a system configuration example of a response processing system 200.

FIG. 2 is an explanatory diagram illustrating the system configuration example of the response processing system 200. In FIG. 2, the response processing system 200 includes the information processing apparatus 101 and a plurality of terminals 201 (three in the example of FIG. 2). In the response processing system 200, the information processing apparatus 101 and the plurality of terminals 201 are connected via a wired or wireless network 210. The network 210 is, for example, a local area network (LAN), a wide area network (WAN), or the Internet.

Here, the information processing apparatus 101 includes a FAQ master 220 and a combination dictionary 230, and narrows down retrieval results for question data. The information processing apparatus 101 is, for example, a server. Storage contents of the FAQ master 220 and the combination dictionary 230 will be described later with reference to FIGS. 4 and 5.

The terminal 201 is a computer used by an administrator or a user of the response processing system 200. The user of the response processing system 200 is, for example, a user of the FAQ system. The terminal 201 is, for example, a personal computer (PC), a smartphone, or a tablet PC.

(Hardware Configuration Example of Information Processing Apparatus 101)

Figure 3:
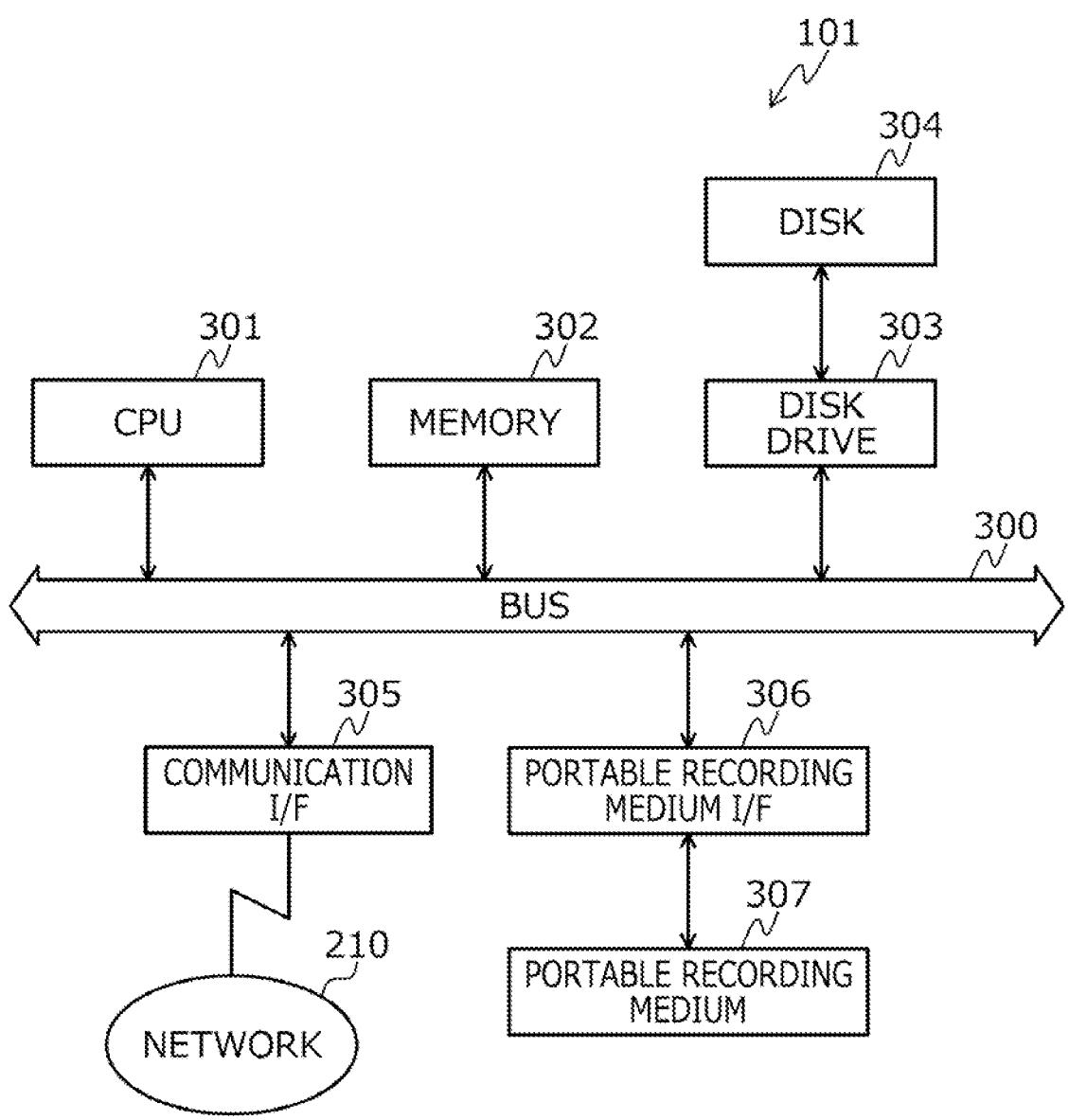
FIG. 3 is a block diagram illustrating a hardware configuration example of an information processing apparatus 101.

FIG. 3 is a block diagram illustrating a hardware configuration example of the information processing apparatus 101. In FIG. 3, the information processing apparatus 101 includes a central processing unit (CPU) 301, a memory 302, a disk drive 303, a disk 304, a communication interface (I/F) 305, a portable recording medium I/F 306, and a portable recording medium 307. Furthermore, the individual components are connected to each other by a bus 300.

Here, the CPU 301 performs overall control of the information processing apparatus 101. The CPU 301 may include a plurality of cores. The memory 302 includes, for example, a read only memory (ROM), a random access memory (RAM), and a flash ROM. For example, the flash ROM stores an operating system (OS) program, the ROM stores an application program, and the RAM is used as a work area for the CPU 301. The programs stored in the memory 302 are loaded into the CPU 301 to cause the CPU 301 to execute coded processing.

The disk drive 303 controls reading and writing of data from and into the disk 304 under the control of the CPU 301. The disk 304 stores data written under the control of the disk drive 303. Examples of the disk 304 include a magnetic disk or an optical disk.

The communication I/F 305 is connected to the network 210 through a communication line and is connected to an external computer (for example, the terminal 201 illustrated in FIG. 2) via the network 210. In addition, the communication I/F 305 manages an interface between the network 210 and the inside of the apparatus, and controls input and output of data to and from the external computer. For example, a modem, a LAN adapter, or the like may be employed as the communication I/F 305.

The portable recording medium I/F 306 controls reading and writing of data from and into the portable recording medium 307 under the control of the CPU 301. The portable recording medium 307 stores data written under the control of the portable recording medium I/F 306. Examples of the portable recording medium 307 include a compact disc (CD)-ROM, a digital versatile disk (DVD), or a universal serial bus (USB) memory.

Note that the information processing apparatus 101 may include, for example, a solid state drive (SSD), an input device, and a display, in addition to the components described above. Furthermore, the information processing apparatus 101 may not include, for example, the disk drive 303, the disk 304, the portable recording medium I/F 306, and the portable recording medium 307 among the components described above. Furthermore, the terminal 201 illustrated in FIG. 2 may also be implemented by a hardware configuration similar to that of the information processing apparatus 101. Note that, the terminal 201 includes an input device, a display, and the like in addition to the components described above.

(Storage Contents of FAQ Master 220)

Next, the storage contents of the FAQ master 220 included in the information processing apparatus 101 will be described with reference to FIG. 4. The FAQ master 220 is implemented by, for example, a storage device such as the memory 302 or the disk 304 illustrated in FIG. 3.

Figure 4:
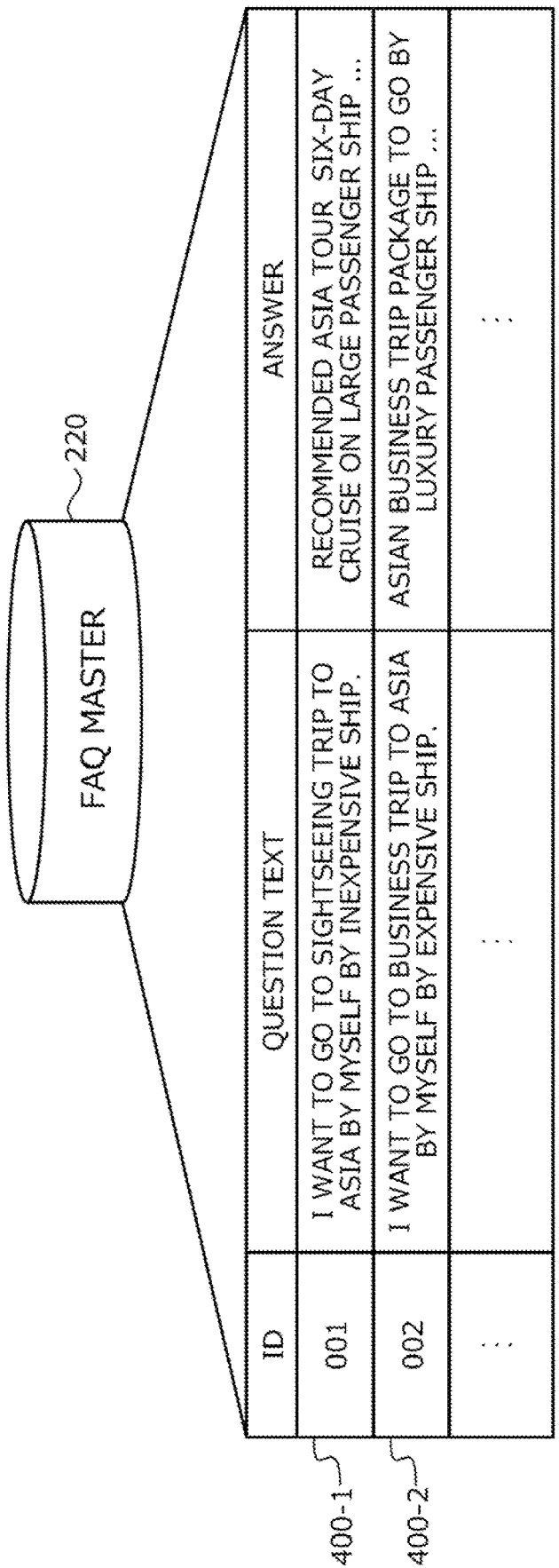
FIG. 4 is an explanatory diagram illustrating an example of storage contents of a frequently asked questions (FAQ) master 220.

FIG. 4 is an explanatory diagram illustrating an example of the storage contents of the FAQ master 220. In FIG. 4, the FAQ master 220 has fields for an ID, a question text, and an answer, and stores a FAQ (for example, FAQs 400-1 and 400-2) as a record by setting information in each field.

Here, ID is an identifier that uniquely identifies the FAQ. The question text is question data indicating a question text that forms the FAQ. The answer is answer data indicating an answer to the question text. The question text and the answer may be expressed by a word or a combination of a plurality of words, or may be expressed by one or a plurality of sentences.

For example, the FAQ 400-1 includes a question text "I want to go to a sightseeing trip to Asia by myself by an inexpensive ship." with an ID "001" and an answer "Recommended Asia tour six-day cruise on a large passenger ship . . . ".

(Storage Contents of Combination Dictionary 230)

Next, the storage contents of the combination dictionary 230 included in the information processing apparatus 101 will be described with reference to FIG. 5. The combination dictionary 230 is implemented by, for example, a storage device such as the memory 302 or the disk 304 illustrated in FIG. 3.

Figure 5:
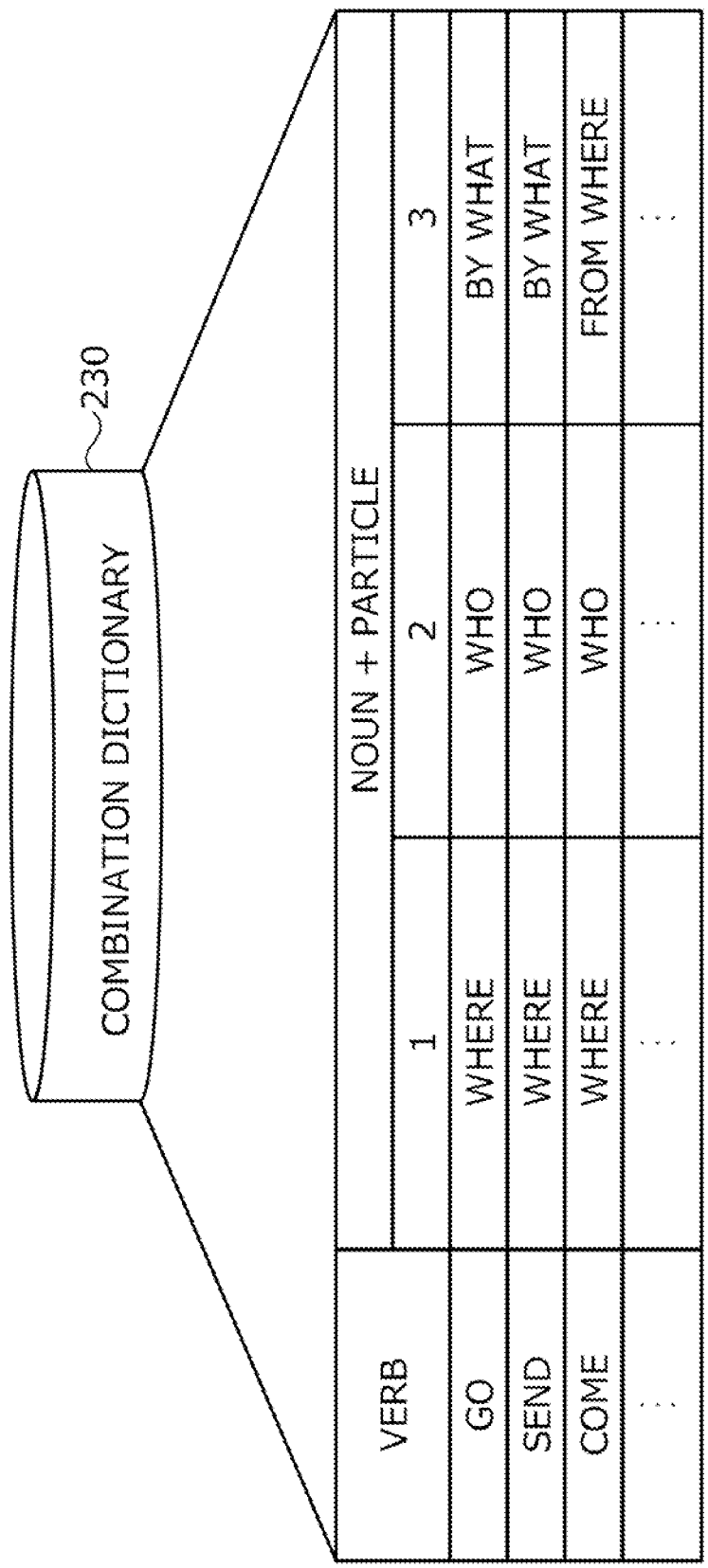
FIG. 5 is an explanatory diagram illustrating an example of storage contents of a combination dictionary 230.

FIG. 5 is an explanatory diagram illustrating an example of the storage contents of the combination dictionary 230. In FIG. 5, the combination dictionary 230 is information that may specify, for each verb, a combination of a noun (including a pronoun) and a particle related to a verb. Numbers 1 to 3 indicate priority orders for the combinations of the noun and the particle related to the verb.

For example, the combination of the noun and the particle of the "first" priority order related to a verb "go" is "where". "where" is a combination of an interrogative pronoun "which" and the particle "to". Furthermore, the combination of the noun and the particle of the "second" priority order related to the verb "go" is "who". "who" is a combination of an interrogative pronoun "who" and a particle "is". Furthermore, the combination of the noun and the particle of the "third" priority order related to the verb "go" is "by what". "by what" is a combination of an interrogative pronoun "what" and the particle "by".

(Functional Configuration Example of Information Processing Apparatus 101)

Figure 6:
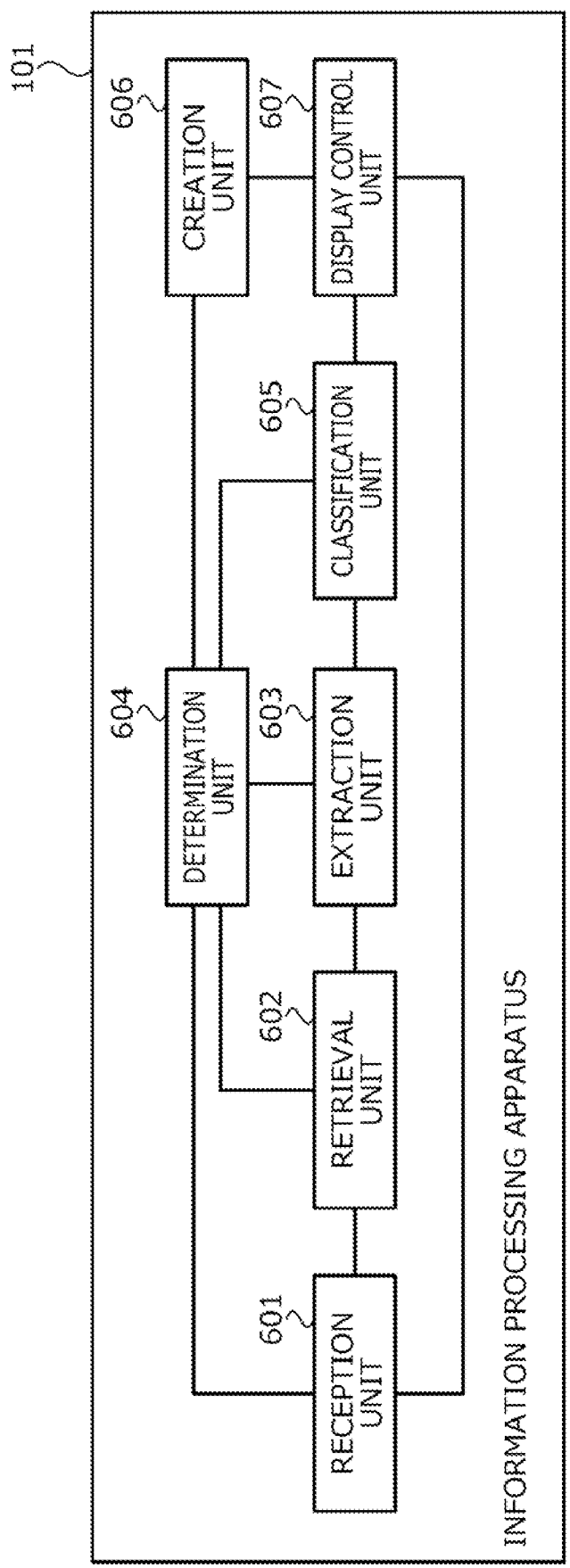
FIG. 6 is a block diagram illustrating a functional configuration example of the information processing apparatus 101.

FIG. 6 is a block diagram illustrating a functional configuration example of the information processing apparatus 101. In FIG. 6, the information processing apparatus 101 includes a reception unit 601, a retrieval unit 602, an extraction unit 603, a determination unit 604, a classification unit 605, a creation unit 606, and a display control unit 607. For example, the reception unit 601 to the display control unit 607 implement the functions by causing the CPU 301 to execute a program stored in a storage device such as the memory 302, the disk 304, or the portable recording medium 307 illustrated in FIG. 3, or by the communication I/F 305. A processing result of each functional unit is stored in, for example, a storage device such as the memory 302 or the disk 304.

The reception unit 601 receives a question from a user input to the terminal 201 (see FIG. 2). For example, by receiving a retrieval word input to the terminal 201 from the terminal 201 used by the user of the response processing system 200, the reception unit 601 receives the received retrieval word as the question.

In the following description, the question may be referred to as "retrieval word".

The retrieval unit 602 retrieves answer candidate data corresponding to a received retrieval word. Here, the answer candidate data is, for example, a FAQ. For example, the retrieval unit 602 retrieves a FAQ corresponding to the retrieval word with reference to the FAQ master 220 illustrated in FIG. 4. Any existing algorithm may be used as algorithm for retrieving the FAQ corresponding to the retrieval word.

For example, the retrieval unit 602 may obtain similarity between the retrieval word and a question text of each FAQ with reference to the FAQ master 220, and retrieve a FAQ including a question text with similarity equal to or higher than a threshold. As the similarity, for example, similarity calculated by using a term frequency-inverse document frequency (TF-IDF) method may be used.

In the following description, the answer candidate data may be referred to as "FAQ".

The extraction unit 603 extracts, in a case where a plurality of FAQs corresponding to a received retrieval word is retrieved, keywords or key phrases from the plurality of FAQs. A word includes of one or a plurality of morphemes. A grammatical element is, for example, parts of speech of words included in the FAQs, a modification relation between the words, or the like. For example, the extraction unit 603 analyzes contents of each of the plurality of FAQs on the basis of words and grammatical elements, and extracts keywords or key phrases from the plurality of FAQs.

In the following description, a keyword or key phrase may be simply referred to as "keyword".

For example, in a case where the number of retrieved FAQs exceeds a predetermined number K, the extraction unit 603 morphologically analyzes questions (or answers) of the retrieved FAQs, and specifies words included in question texts of the FAQs and parts of speech of the words. The predetermined number K may be optionally set, and is set to, for example, the maximum number of FAQs (about 3 to 5) that may be displayed at one time as retrieval results. Then, the extraction unit 603 extracts keywords including a combination of a noun and a particle on the basis of the specified parts of speech of the words included in the question texts of the FAQs.

The determination unit 604 determines a verb to be used in a response text to a retrieval word from contents of a plurality of retrieved FAQs. For example, the determination unit 604 may determine a verb that appears most frequently among verbs included in questions of the plurality of retrieved FAQs as the verb to be used in the response text to the retrieval word.

Furthermore, for example, the information processing apparatus 101 may present verbs (for example, the top two or three verbs that appear frequently) included in the questions of the plurality of retrieved FAQs to a user in a selectable manner, and receive selection of a verb. In this case, the determination unit 604 may determine the selected verb as the verb to be used in the response text to the retrieval word.

The classification unit 605 classifies extracted keywords on the basis of words included in the keywords. For example, the classification unit 605 may classify the extracted keywords by collecting keywords including words having the same meaning. Furthermore, the classification unit 605 may classify the extracted keywords on the basis of meanings of nouns and types of particles included in the keywords. The meanings of the words are specified, for example, from dictionary information stored in advance.

For example, the classification unit 605 performs the classification by collecting keywords including a combination of a noun and a particle corresponding to a determined verb with reference to the combination dictionary 230 illustrated in FIG. 5. As an example, it is assumed that the verb "go" is determined as a verb to be used in a response text to a retrieval word.

In this case, the classification unit 605 specifies, for example, "where" as the combination of the noun and the particle of the "first" priority order related to the verb "go" with reference to the combination dictionary 230. Then, the classification unit 605 specifies the noun (interrogative pronoun) "which" and the particle "to" in the specified combination "where". Then, the classification unit 605 performs the classification by collecting keywords including a combination of a noun corresponding to the specified interrogative pronoun "which" and the specified particle "to". The noun corresponding to the interrogative pronoun "which" is, for example, a noun meaning a place.

Furthermore, the classification unit 605 specifies, for example, "who" as the combination of the noun and the particle of the "second" priority order related to the verb "go" with reference to the combination dictionary 230. Then, the classification unit 605 specifies the noun (interrogative pronoun) "who" and the particle "is" in the specified combination "who". Then, the classification unit 605 performs the classification by collecting keywords including a combination of a noun corresponding to the specified interrogative pronoun "who" and the specified particle "is". The noun corresponding to the interrogative pronoun "who" is, for example, a noun meaning a person.

Furthermore, the classification unit 605 specifies, for example, "by what" as the combination of the noun and the particle of the "third" priority order related to the verb "go" with reference to the combination dictionary 230. Then, the classification unit 605 specifies the noun (interrogative pronoun) "what" and the particle "by" in the specified combination "by what". Then, the classification unit 605 performs the classification by collecting keywords including a combination of a noun corresponding to the specified interrogative pronoun "what" and the specified particle "by". The noun corresponding to the interrogative pronoun "what" is, for example, a noun meaning a vehicle.

The creation unit 606 creates a response text to a retrieval word on the basis of a determined verb. Here, the response text to the retrieval word is a response text displayed together with a classification result of keywords, and prompts selection of a keyword. As an example, it is assumed that the verb "go" is determined as a verb to be used in the response text to the retrieval word.

Furthermore, it is assumed that the classification result of the keywords is a collection of keywords including a combination of a noun corresponding to the interrogative pronoun "which" and the particle "to". In this case, the creation unit 606 creates, for example, a response text "Where do you want to go?" corresponding to the classification result of the keywords from the verb "go" and the combination of the noun and the particle "where".

Furthermore, it is assumed that the classification result of the keywords is a collection of keywords including a combination of a noun corresponding to the interrogative pronoun "who" and the particle "is". In this case, the creation unit 606 creates, for example, a response text "Who wants to go?" corresponding to the classification result of the keywords from the verb "go" and the combination of the noun and the particle "who".

Furthermore, it is assumed that the classification result of the keywords is a collection of keywords including a combination of a noun corresponding to the interrogative pronoun "what" and the particle "by". In this case, the creation unit 606 creates, for example, a response text "Which vehicle do you want to use to go there?" corresponding to the classification result of the keywords from the verb "go" and the combination of the noun and the particle "by what".

Note that the creation unit 606 may use a preset response text as the response text to the retrieval word. As the preset response text, for example, those that may respond to any question text, such as "Which one would you like?" or "What are you inquiring about?" are set.

The display control unit 607 outputs a classification result of keywords to the terminal 201 in a state selectable by a user, together with a response text to a retrieval word. For example, the display control unit 607 may display, on the terminal 201, a response screen including a created response text or a preset response text and a classification result of keywords. The terminal 201 is, for example, the terminal 201 that has received a retrieval word.

For example, it is assumed that the classification result of the keywords is a collection of keywords including a combination of a noun corresponding to the interrogative pronoun "which" (for example, Asia or North America) and the particle "to". In this case, the display control unit 607 displays the classification result of the keywords together with the created response text "Where do you want to go?".

Note that a display example of the classification result of the keywords displayed together with the response text to the retrieval word will be described later with reference to FIG. 7.

Furthermore, the reception unit 601 receives selection of any keyword from a displayed classification result of keywords. The selection of the keyword is performed on response screens 710 and 720 as illustrated in FIG. 7 described later, for example. For example, the reception unit 601 receives the selection of the keyword by receiving a selection result of the keyword from the terminal 201.

Furthermore, the retrieval unit 602 retrieves FAQs corresponding to a retrieval word on the basis of a received keyword and the retrieval word. For example, the retrieval unit 602 may retrieve a FAQ including the received keyword among the FAQs corresponding to the retrieval word. With this configuration, the FAQs as the retrieval results corresponding to the retrieval word may be narrowed down by using the keyword selected by a user.

Furthermore, in a case where the number of retrieved FAQs is equal to or smaller than the predetermined number K, the display control unit 607 outputs the retrieved FAQs to the terminal 201 as retrieval results. At this time, the display control unit 607 may output an input retrieval word and a selected keyword together. For example, the display control unit 607 may display, on the terminal 201, a retrieval result screen including question texts of the retrieved FAQs. The terminal 201 is, for example, the terminal 201 that has received the retrieval word.

Furthermore, the extraction unit 603 may extract keywords including a combination of a noun modifier and a modificand on the basis of parts of speech of words included in each of a plurality of retrieved FAQs and a modification relation between the words. Here, the modifier is a clause that explains another clause. The modificand is a clause explained by the modifier.

For example, in a case where only a noun is specified as a retrieval word, or in a case where question texts of the retrieved FAQs do not include a verb, the extraction unit 603 may extract keywords including a combination of a noun modifier and a modificand from the question texts of the FAQs. An extraction example of keywords including a combination of a noun modifier and a modificand will be described later with reference to FIG. 8.

The extracted keywords including a combination of a modifier and a modificand are classified on the basis of, for example, meanings of words included in the keywords. For example, the classification unit 605 may classify the extracted keywords by collecting keywords including words having the same meaning.

Furthermore, the reception unit 601 may receive input of a response text corresponding to a classification result of keywords. For example, first, the display control unit 607 displays an administrator screen including the classification result of the keywords on the terminal 201 used by an administrator of the response processing system 200.

The administrator screen is an operation screen for registration of a response text corresponding to the classification result of the keywords. A screen example of the administrator screen will be described later with reference to FIGS. 9A and 9B. In this case, by receiving the response text input on the administrator screen from the terminal 201, the reception unit 601 receives the received response text.

Then, the display control unit 607 registers the received response text and the classification result of the keywords in association with each other. For example, the display control unit 607 may register the received response text and the classification result of the keywords in association with each other in a response text dictionary 1000 as illustrated in FIG. 10, which will be described later.

In this case, when retrieval results for a retrieval word input by a user are narrowed down, for example, the display control unit 607 may output the classification result of the keywords together with the response text corresponding to the classification result of the keywords with reference to the response text dictionary 1000.

(Screen Example of Response Screen)

Next, a screen example of the response screen displayed on the terminal 201 will be described with reference to FIG. 7. The response screen is an operation screen displayed to narrow down retrieval results in a case where the number of FAQs retrieved as FAQs corresponding to a retrieval word exceeds the predetermined number K.

Figure 7:
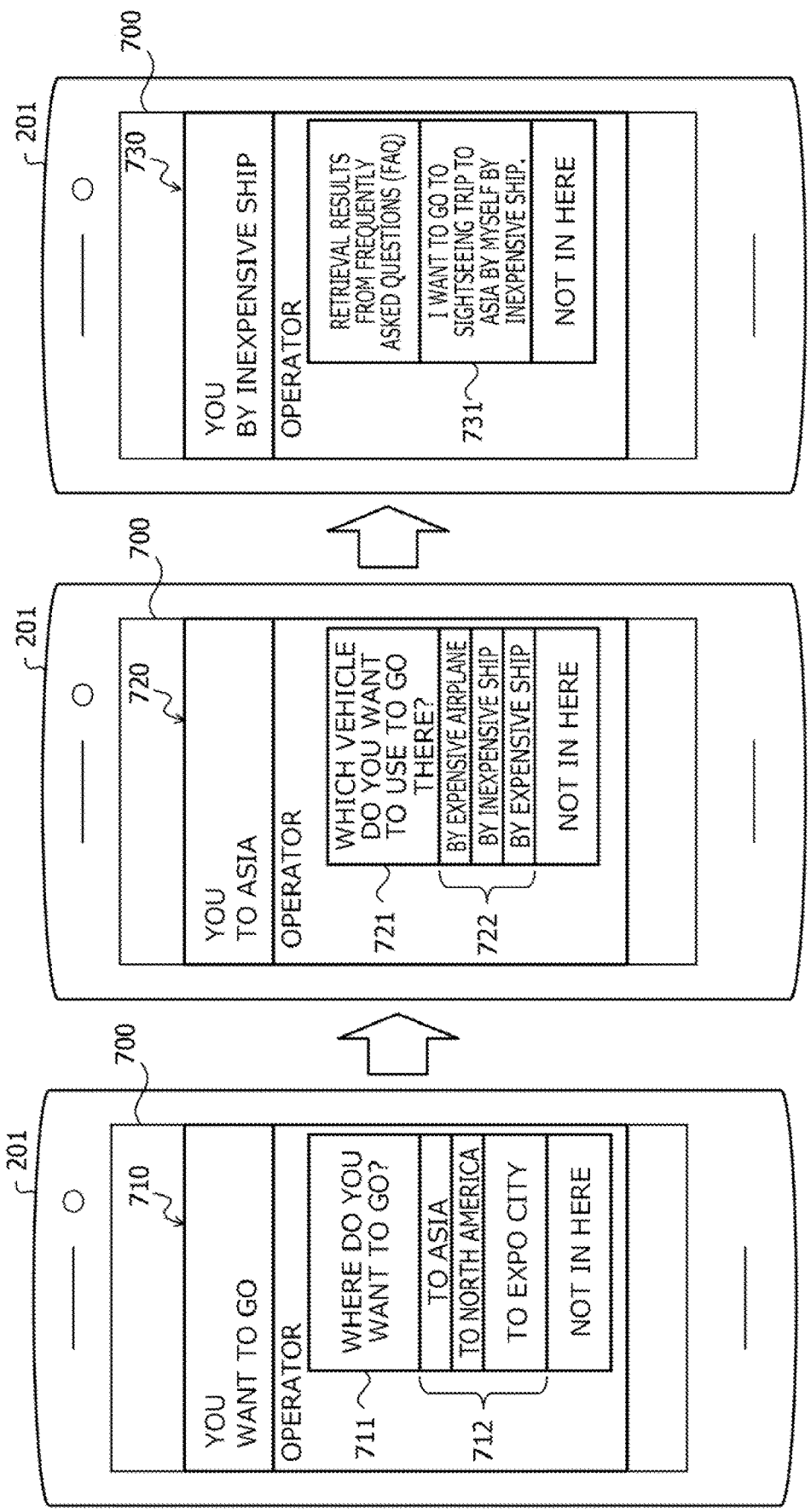
FIG. 7 is an explanatory diagram illustrating a screen example of a response screen.

FIG. 7 is an explanatory diagram illustrating the screen example of the response screen. In FIG. 7, the response screen 710 is displayed on a display 700 of the terminal 201. The response screen 710 is an example of an operation screen displayed to narrow down retrieval results of FAQs retrieved for a retrieval word "want to go".

The response screen 710 includes a response text 711 and a keyword list 712. The response text 711 is a response text to the retrieval word "want to go". The response text 711 is an example of a response text created on the basis of the verb "go" determined by the determination unit 604. The keyword list 712 is a classification result of keywords. The keyword list 712 is a list of keywords classified on the basis of "where" as the combination of the noun and the particle of the "first" priority order related to the verb "go".

Note that, in a case where a user determines that none of the keywords in the keyword list 712 is related to the retrieval word, "not in here" is selected.

According to the response screen 710, the user of the terminal 201 may select a keyword for narrowing down the FAQs as the retrieval results depending on where the user wants to go. Here, it is assumed that a keyword "to Asia" is selected. In this case, re-retrieval of FAQs is performed on the basis of the keyword "to Asia" and the retrieval word "want to go".

Here, it is assumed that the number of retrieved FAQs still exceeds the predetermined number K as a result of the re-retrieval of the FAQs. In this case, the response screen 720 is displayed on the display 700 of the terminal 201. The response screen 720 includes a response text 721 and a keyword list 722.

The response text 721 is a response text to the retrieval word "want to go". The response text 721 is an example of a response text created on the basis of the verb "go" determined by the determination unit 604. The keyword list 722 is a classification result of keywords. The keyword list 722 is a list of keywords classified on the basis of "by what" as the combination of the noun and the particle of the "third" priority order related to the verb "go".

Note that, in a case where the user determines that none of the keywords in the keyword list 722 is related to the retrieval word, "not in here" is selected. Furthermore, it is assumed that a classification result of keywords corresponding to "who" as the combination of the noun and the particle of the "second" priority order related to the verb "go" is not displayed because a keyword corresponding to "who" has not been extracted.

According to the response screen 720, the user of the terminal 201 may select a keyword for narrowing down the FAQs as the retrieval results depending on a vehicle the user wants to use. Here, it is assumed that a keyword "by an inexpensive ship" is selected. In this case, for example, re-retrieval of FAQs is performed on the basis of the keyword "to Asia", the keyword "by an inexpensive ship", and the retrieval word "want to go".

Here, it is assumed that the number of retrieved FAQs is equal to or smaller than the predetermined number K as a result of the re-retrieval of the FAQs. In this case, a retrieval result screen 730 is displayed on the display 700 of the terminal 201. The retrieval result screen 730 includes a retrieval result 731 corresponding to the retrieval word "want to go", which is obtained by narrowing down by using the keywords "to Asia" and "by an inexpensive ship".

In this way, according to the information processing apparatus 101, the retrieval results that are answer candidates corresponding to the retrieval word "want to go" may be narrowed down by using the keywords "to Asia" and "by an inexpensive ship" selected by the user on the response screens 710 and 720.

Note that, here, in the classification result of the keywords, keywords are displayed in descending order of priority, but the embodiment is not limited to this. For example, in a case where "I want to go to Asia" is input as the retrieval word, the information processing apparatus 101 may not display keywords classified on the basis of "where" as the combination of the noun and the particle of the "first" priority order related to the verb "go".

(Extraction Example of Keywords Including Combination of Modifier and Modificand)

Next, an extraction example of keywords including a combination of a noun modifier and a modificand will be described with reference to FIG. 8.

Figure 8:
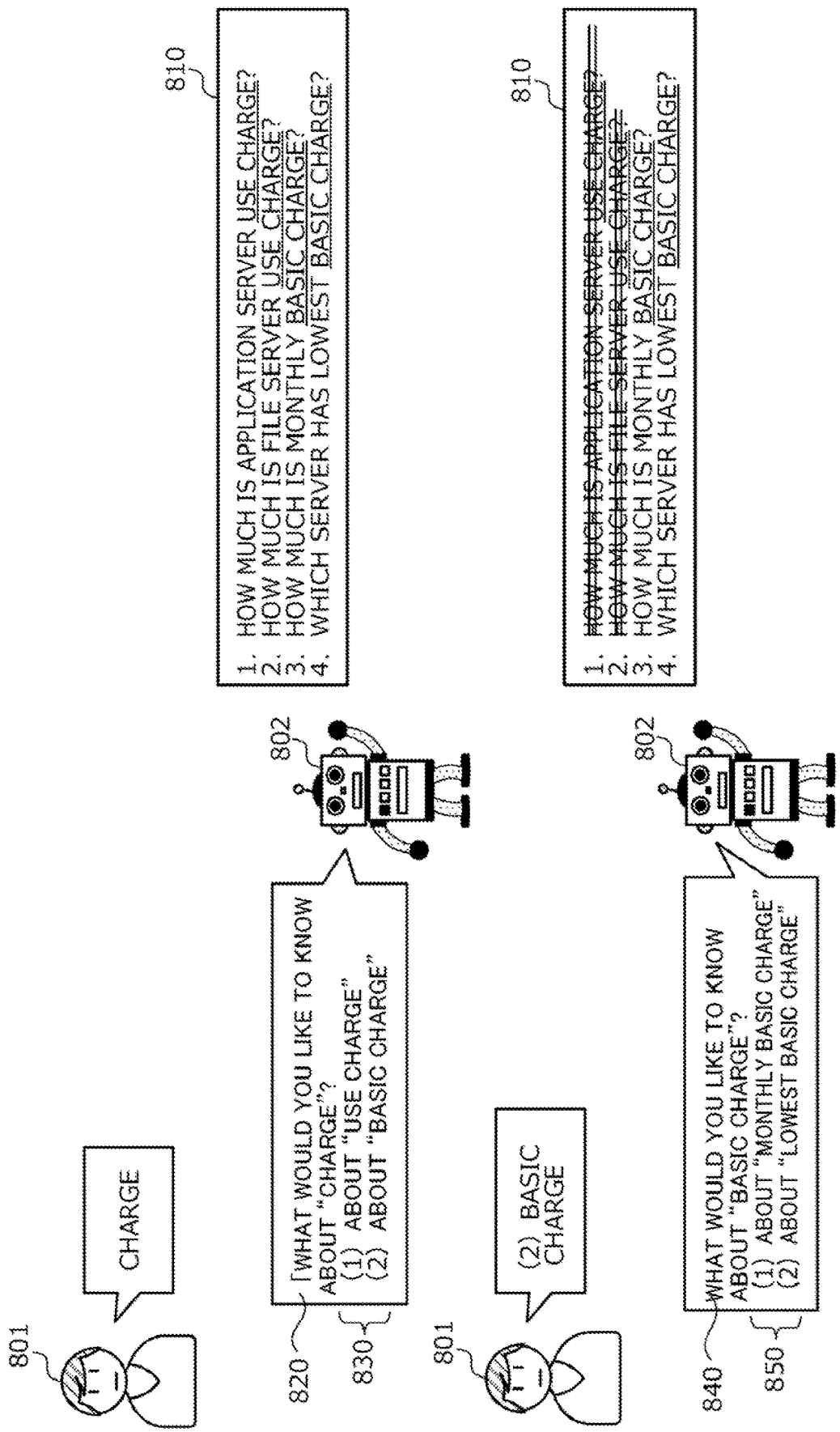
FIG. 8 is an explanatory diagram illustrating an extraction example of keywords including a combination of a modifier and a modificand.

FIG. 8 is an explanatory diagram illustrating the extraction example of keywords including a combination of a modifier and a modificand. In FIG. 8, a retrieval result 810 corresponding to a retrieval word "charge" is displayed. The retrieval result 810 includes question texts 1 to 4 of FAQs corresponding to the retrieval word "charge". Note that, the predetermined number K is set to "K=1". In FIG. 8, an icon 801 represents a user. An icon 802 represents a chatbot.

The extraction unit 603 extracts keywords including a combination of a noun modifier and a modificand on the basis of parts of speech of words which are obtained by performing natural language processing on each of the question texts 1 to 4 of the FAQs and are included in each of the question texts 1 to 4 of the FAQs, and a modification relation between the words. Examples of the natural language processing include morphological analysis and syntactic analysis.

Here, it is assumed that a keyword "use charge" which is a combination of a noun modifier "use" and a modificand "charge", and a keyword "basic charge" which is a combination of a noun modifier "basic" and a modificand "charge" are extracted.

The extracted keywords "use charge" and "basic charge" are classified into the same group on the basis of meanings of the words (for example, representing some charge). In this case, a keyword list 830 is displayed together with a response text 820 to the retrieval word "charge". The response text 820 is created, for example, by inserting the modificand "charge" into a part " . . . " of a fixed phrase "What would you like to know about . . . ?".

Here, it is assumed that the keyword "basic charge" is selected from the keyword list 830. In this case, for example, re-retrieval of FAQs is performed on the basis of the retrieval word "charge" and the keyword "basic charge", and in the retrieval result 810 corresponding to the retrieval word "charge", the question texts 1 and 2 of the FAQs that do not correspond to the keyword "basic charge" are excluded.

Next, the extraction unit 603 extracts keywords including a combination of a modifier and a modificand on the basis of parts of speech of words included in each of the question texts 3 and 4 of the FAQs and a modification relation between the words. Here, it is assumed that a keyword "monthly basic charge" which is a combination of a modifier "monthly" and a modificand "basic charge", and a keyword "lowest basic charge" which is a combination of a modifier "lowest" and a modificand "basic charge" are extracted.

The extracted keywords "monthly basic charge" and "lowest basic charge" are classified into the same group on the basis of meanings of the words (for example, representing the basic charge). In this case, a keyword list 850 is displayed together with a response text 840 to the selected keyword "basic charge". The response text 840 is created, for example, by inserting the modificand "basic charge" into a part " . . . " of the fixed phrase "What would you like to know about . . . ?".

Here, it is assumed that the keyword "monthly basic charge" is selected from the keyword list 850. In this case, in addition, re-retrieval of FAQs is performed on the basis of the keyword "monthly basic charge", and in the retrieval result 810 corresponding to the retrieval word "charge", only the question text 3 of the FAQ corresponding to the keyword "monthly basic charge" is retrieved. Thus, the number of retrieved FAQs becomes equal to or smaller than the predetermined number K, and for example, a retrieval result screen including the question text 3 is displayed.

(Screen Example of Administrator Screen)

Next, the screen example of the administrator screen will be described with reference to FIGS. 9A and 9B. The administrator screen is displayed on the terminal 201 used by an administrator of the response processing system 200, for example, when a response text corresponding to a classification result of keywords is input.

Figure 9A:
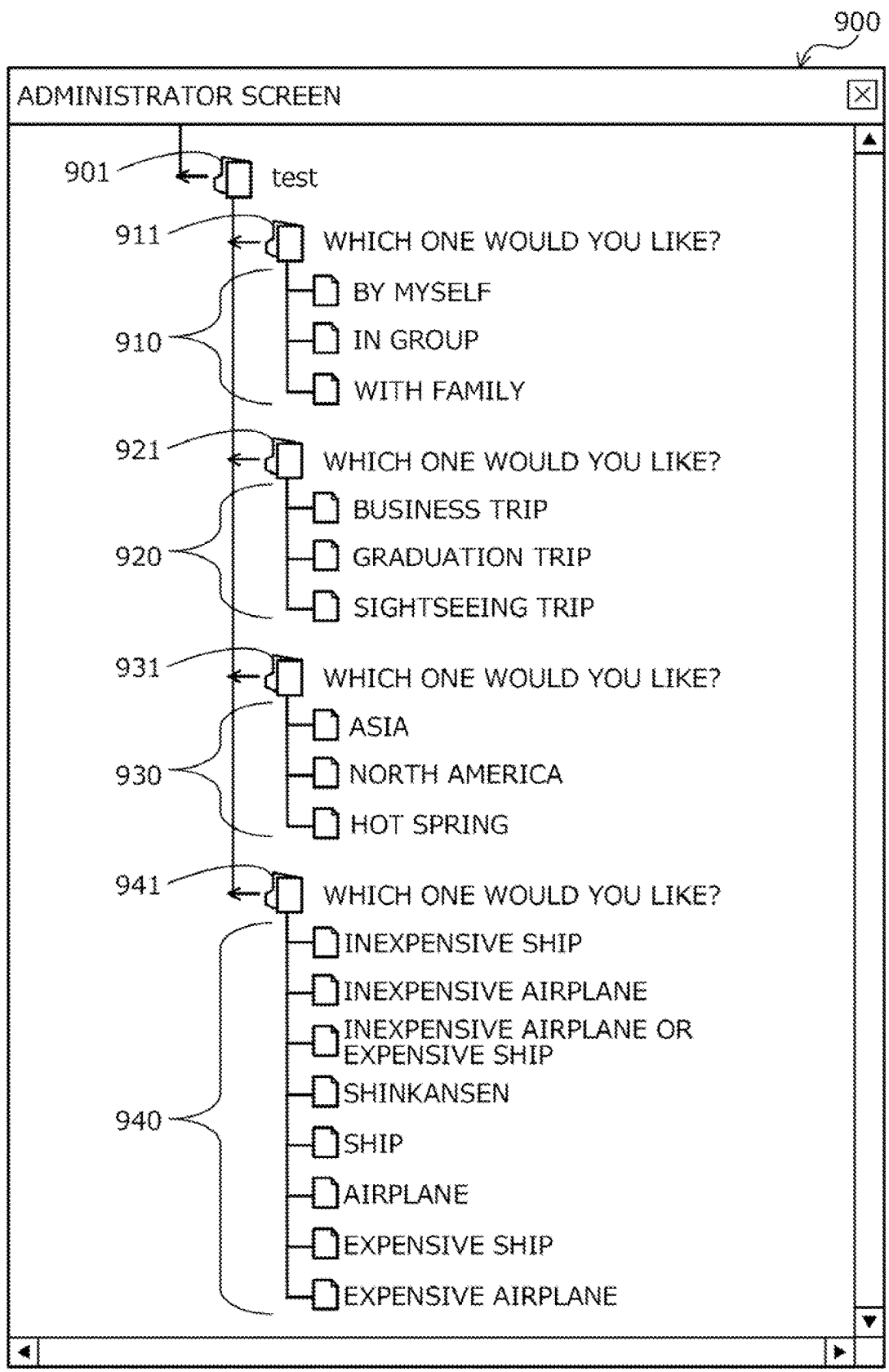
FIG. 9A is an explanatory diagram (part 1) illustrating a screen example of an administrator screen.

FIGS. 9A and 9B are explanatory diagrams illustrating screen examples of the administrator screen. In FIG. 9A, an administrator screen 900 is an example of an operation screen for inputting a response text corresponding to a classification result of keywords (for example, classification results 910, 920, 930, and 940).

The classification result of the keywords is, for example, a classification of keywords extracted from question texts of FAQs retrieved according to a retrieval word input by the administrator. Note that it is assumed that nouns (including "adjective+noun") are extracted as the keywords.

On the administrator screen 900, for example, when a response text item 911 is selected by operation input using an input device (not illustrated), a response text corresponding to the classification result 910 of the keywords may be input. Note that, in an initial state, a fixed phrase "Which one would you like?" is set as the response text corresponding to the classification result of the keywords.

Furthermore, when a response text item 921 is selected, a response text corresponding to the classification result 920 of the keywords may be input. Furthermore, when a response text item 931 is selected, a response text corresponding to the classification result 930 of the keywords may be input. Furthermore, when a response text item 941 is selected, a response text corresponding to the classification result 940 of the keywords may be input.

Furthermore, on the administrator screen 900, when a category item 901 is selected by operation input using the input device (not illustrated), a category of the response texts corresponding to the classification results of the keywords may be input.

In the example of FIG. 9B, a response text "Are you alone? Or is there anyone else?" corresponding to the classification result 910 of the keywords is input. A response text "Which is a purpose of the trip?" corresponding to the classification result 920 of the keywords is input. A response text "Which is your destination?" corresponding to the classification result 930 of the keywords is input. A response text "Which vehicle do you use for moving?" corresponding to the classification result 940 of the keywords is input. Furthermore, a category "trip" of the response texts corresponding to the classification results 910, 920, 930, and 940 of the keywords is input.

In this way, according to the administrator screen 900, a response text corresponding to a classification result of keywords may be input. Note that a result input on the administrator screen 900 is, for example, transmitted from the terminal 201 to the information processing apparatus 101 and stored in the response text dictionary 1000 as illustrated in FIG. 10. The response text dictionary 1000 is implemented by, for example, a storage device such as the memory 302 or the disk 304 illustrated in FIG. 3.

FIG. 10 is an explanatory diagram illustrating an example of storage contents of the response text dictionary 1000. In FIG. 10, the response text dictionary 1000 has fields for a category, a keyword, and a response text, and stores response text information (for example, response text information 1000-1 and 1000-2) as a record by setting information in each field.

Here, the category is a category of a response text corresponding to a classification result of keywords. The keyword is the classification result of the keywords. The response text is a response text corresponding to the classification result of the keywords.

The display control unit 607 may display a classification result of keywords together with a response text corresponding to the classification result of the keywords with reference to the response text dictionary 1000. For example, the display control unit 607 specifies the response text corresponding to the classification result of the keywords with reference to the response text dictionary 1000. The classification result of the keywords is, for example, a classification of keywords extracted from question texts of FAQs retrieved according to a retrieval word input by a user of the response processing system 200.

As an example, it is assumed that the classification result of the keywords is "by myself, in group, and with family". In this case, the display control unit 607 specifies a response text "Are you alone? Or is there anyone else?" corresponding to the classification result of the keywords "by myself, in group, and with family" with reference to the response text dictionary 1000. Then, the display control unit 607 displays the classification result of the keywords "by myself, in group, and with family" together with the specified response text "Are you alone? Or is there anyone else?".

Furthermore, it is assumed that the classification result of the keywords is "by myself, with family, and as couple". In this case, the display control unit 607 specifies the response text "Are you alone? Or is there anyone else?" corresponding to the keywords "by myself and with family" included in the classification result of the keywords "by myself, with family, and as couple" with reference to the response text dictionary 1000. Then, the display control unit 607 displays the classification result of the keywords "by myself, with family, and as couple" together with the specified response text "Are you alone? Or is there anyone else?".

(Response Processing Procedure of Information Processing Apparatus 101)

Next, a response processing procedure of the information processing apparatus 101 will be described with reference to FIG. 11.

Figure 11:
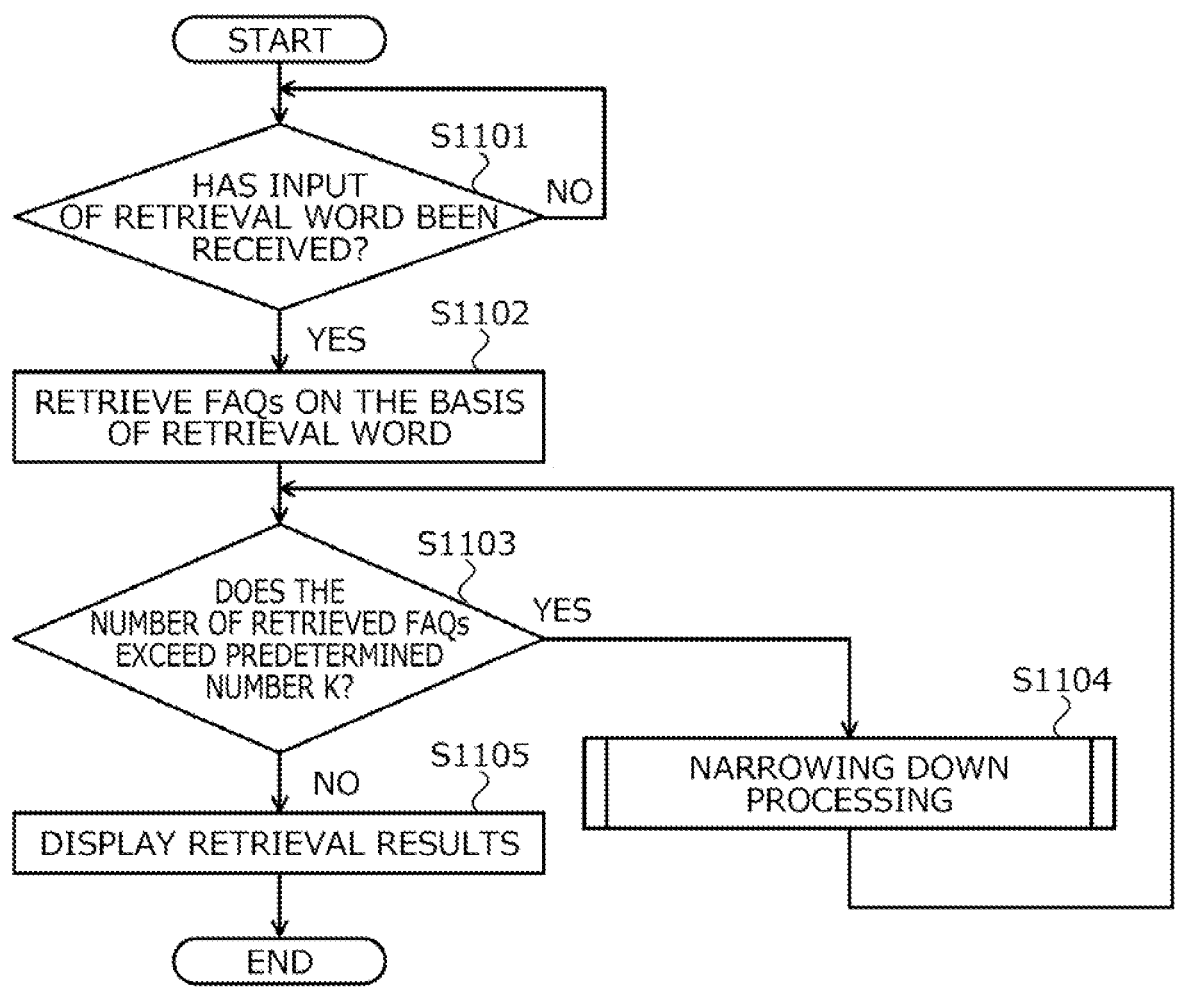
FIG. 11 is a flowchart illustrating an example of a response processing procedure of the information processing apparatus 101.

FIG. 11 is a flowchart illustrating an example of the response processing procedure of the information processing apparatus 101. In the flowchart of FIG. 11, first, the information processing apparatus 101 determines whether or not input of a retrieval word has been received (Step S1101). Here, the information processing apparatus 101 stands by until the input of the retrieval word is received (Step S1101: No).

Then, in a case where the input of the retrieval word has been received (Step S1101: Yes), the information processing apparatus 101 retrieves FAQs on the basis of the input retrieval word with reference to the FAQ master 220 (Step S1102). Next, the information processing apparatus 101 determines whether or not the number of retrieved FAQs exceeds the predetermined number K (Step S1103).

Here, in a case where the number of retrieved FAQs exceeds the predetermined number K (Step S1103: Yes), the information processing apparatus 101 executes narrowing down processing for narrowing down the retrieved FAQs (Step S1104). The specific processing procedure of the narrowing down processing will be described later with reference to FIG. 12.

On the other hand, in a case where the number of retrieved FAQs is equal to or smaller than the predetermined number K (Step S1103: No), the information processing apparatus 101 displays the retrieved FAQs (for example, question texts) as retrieval results (Step S1105), and ends a series of the processing according to this flowchart.

With this configuration, the retrieval results of the FAQs corresponding to the retrieval word input by a user may be narrowed down until the number of the FAQs becomes equal to or smaller than the predetermined number K and presented.

Next, the specific processing procedure of the narrowing down processing in Step S1104 illustrated in FIG. 11 will be described.

Figure 12:
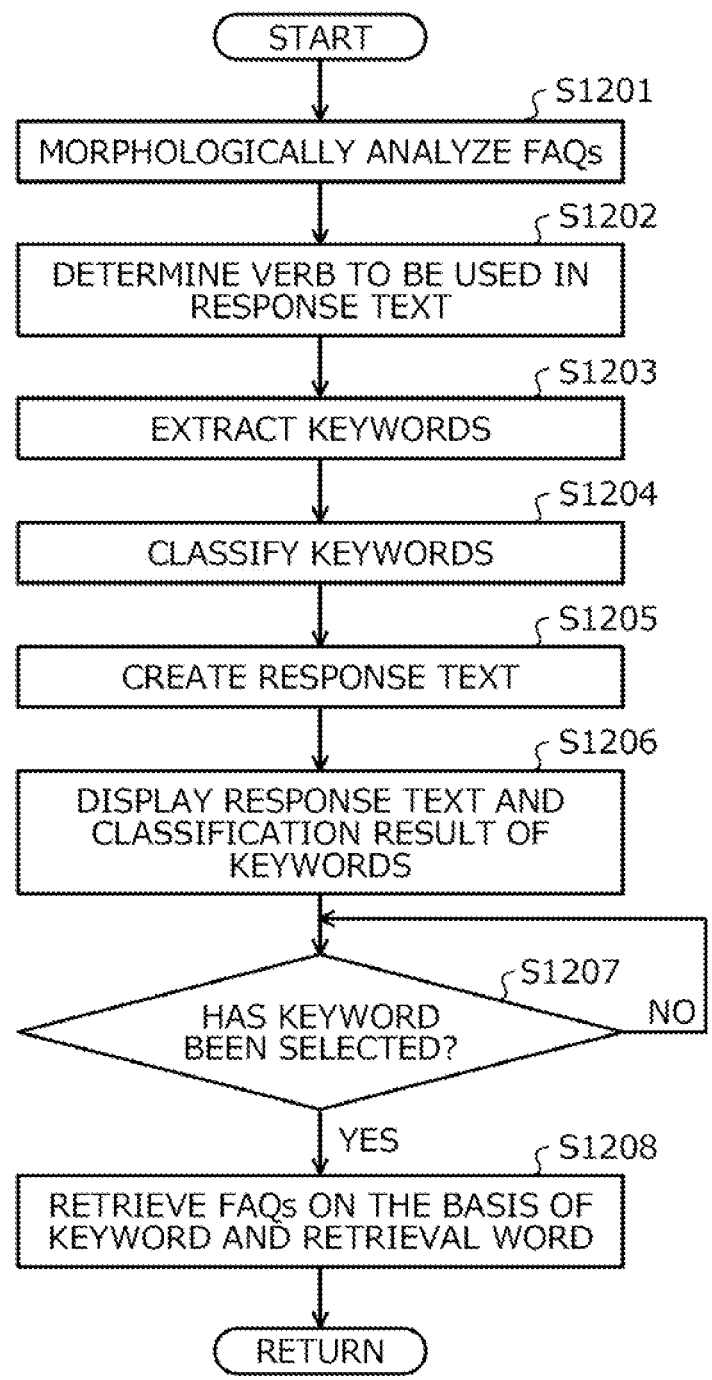
FIG. 12 is a flowchart illustrating an example of a specific processing procedure of narrowing down processing.

FIG. 12 is a flowchart illustrating an example of the specific processing procedure of the narrowing down processing. In the flowchart of FIG. 12, first, the information processing apparatus 101 morphologically analyzes the retrieved FAQs (for example, question texts) (Step S1201). Next, the information processing apparatus 101 determines a verb to be used in a response text to the retrieval word on the basis of a result of the morphological analysis (Step S1202).

Then, the information processing apparatus 101 extracts keywords including a combination of a noun and a particle from the plurality of retrieved FAQs on the basis of the result of the morphological analysis (Step S1203). Next, the information processing apparatus 101 classifies the extracted keywords by collecting keywords including a combination of a noun and a particle corresponding to the determined verb with reference to the combination dictionary 230 (Step S1204).

Next, the information processing apparatus 101 creates a response text corresponding to a classification result of the keywords on the basis of the determined verb (Step S1205). Then, the information processing apparatus 101 displays the classification result of the keywords corresponding to the response text together with the created response text (Step S1206). At this time, the information processing apparatus 101 displays, for example, the response text and the classification result of the keywords in descending order of priority with reference to the combination dictionary 230.

Next, the information processing apparatus 101 determines whether or not any keyword in the displayed classification result of the keywords has been selected (Step S1207). Here, the information processing apparatus 101 stands by until the keyword is selected (Step S1207: No).

Then, in a case where the keyword has been selected (Step S1207: Yes), the information processing apparatus 101 retrieves FAQs corresponding to the retrieval word on the basis of the selected keyword and the retrieval word with reference to the FAQ master 220 (Step S1208), and returns to the step in which the narrowing down processing is called.

With this configuration, the keywords extracted by analyzing contents of the FAQs as the retrieval results may be automatically classified, and a keyword corresponding to each classification may be presented to the user. Furthermore, the FAQs as the retrieval results corresponding to the retrieval word may be narrowed down by using the keyword selected by the user.

As described above, according to the information processing apparatus 101 according to the embodiment, in a case where a plurality of FAQs corresponding to a received retrieval word is retrieved, keywords or key phrases may be extracted from the plurality of FAQs. Then, according to the information processing apparatus 101, the extracted keywords or key phrases may be classified on the basis of words included in the keywords or key phrases, and a classification result of the keywords or key phrases may be displayed in a selectable manner together with a response text to the retrieval word.

With this configuration, the keywords of key phrases extracted by analyzing contents of the FAQs as the retrieval results may be automatically classified and presented to a user in a selectable manner. Thus, in a case where the number of FAQs as the retrieval results exceeds a predetermined number such as the maximum display number (predetermined number K), for example, it is possible to present a keyword or key phrase corresponding to each classification to the user in a selectable manner so that a keyword or key phrase used for narrowing down the retrieval results of the FAQs may be easily selected. Therefore, by using the keyword or key phrase selected by the user, it is possible to narrow down the retrieval results of the FAQs.

Furthermore, according to the information processing apparatus 101, key phrases including a combination of a noun and a particle are extracted on the basis of parts of speech of words included in each of the plurality of FAQs, and the extracted key phrases may be classified on the basis of meanings of nouns and types of particles included in the key phrases.

With this configuration, key phrases representing what the user wants to do or know may be classified and presented according to meanings of nouns and types of particles included in the key phrases, and a key phrase considered to be related to a question may be easily selected.

Furthermore, according to the information processing apparatus 101, a verb to be used for the response text to the retrieval word may be determined from contents of the plurality of retrieved FAQs, and the response text to the retrieval word may be created on the basis of the determined verb. Then, according to the information processing apparatus 101, classification by collecting key phrases including a combination of a noun and a particle corresponding to the determined verb may be performed for each verb with reference to dictionary information (for example, the response text dictionary 1000) that is capable of specifying a combination of a noun and a particle related to the verb, and the classification result of the key phrases may be output together with the created response text.

With this configuration, key phrases (nouns+particles) expected from a characteristic verb in FAQs as the retrieval results may be automatically classified and presented together with a natural response text using the verb.

Furthermore, according to the information processing apparatus 101, selection of any keyword or key phrase from the displayed classification result of the keywords or key phrases may be received, and on the basis of the received keyword or key phrase and the retrieval word, FAQs corresponding to the retrieval word may be retrieved.

With this configuration, the FAQs as the retrieval results corresponding to the retrieval word may be narrowed down by using the keyword or key phrase selected by the user.

Furthermore, according to the information processing apparatus 101, input of a response text corresponding to the classification result of the keywords or key phrases may be received, and the received response text and the classification result of the keywords or key phrases may be registered in the response text dictionary 1000 in association with each other.

With this configuration, an administrator or the like of the response processing system 200 may register an appropriate response text corresponding to the classification result of the keywords or key phrases in advance.

Furthermore, according to the information processing apparatus 101, the classification result of the keywords or key phrases may be output together with the response text corresponding to the classification result of the keywords or key phrases with reference to the response text dictionary 1000.

With this configuration, the classification result of the keywords or key phrases may be presented together with a natural response text.

Furthermore, according to the information processing apparatus 101, key phrases including a combination of a noun modifier and a modificand may be extracted on the basis of parts of speech of words included in each of the plurality of retrieved FAQs and a modification relation between the words.

With this configuration, for example, in a case where only a noun is specified as the retrieval word and a characteristic verb in the FAQs as the retrieval results may not be determined, a combination of a noun modifier and a modificand may be extracted as the key phrase.

From these facts, according to the information processing apparatus 101 and the response processing system 200 according to the embodiment, it is possible to perform narrowing down by making it easier to select a keyword or key phrase used to narrow down retrieval results for a retrieval word, and as a result, man-hours needed to obtain a desired FAQ may be reduced, and convenience of a user may be improved.

Note that the response processing method described in the present embodiment may be implemented by executing a program prepared in advance on a computer such as a personal computer or a workstation. This response processing program is recorded on a computer-readable recording medium such as a hard disk, a flexible disk, a CD-ROM, a DVD, or a USB memory and is read from the recording medium to be executed by the computer. Furthermore, this response processing program may be distributed via a network such as the Internet.

Furthermore, the information processing apparatus 101 described in the present embodiment may also be implemented by a special-purpose integrated circuit (IC) such as a standard cell or a structured application specific integrated circuit (ASIC) or a programmable logic device (PLD) such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a response processing program for causing a computer to execute processing comprising:

receiving a question from a user input to a terminal;

extracting, in a case where a plurality of pieces of answer candidate data that corresponds to the received question is retrieved, keywords or key phrases from the plurality of pieces of answer candidate data;

classifying the extracted keywords or key phrases on the basis of words included in the keywords or key phrases; and outputting a classification result of the keywords or key phrases to the terminal in a state selectable by a user, together with a response text to the question, wherein in the processing of extracting, contents of each of the plurality of pieces of answer candidate data are analyzed on the basis of words and grammatical elements, and keywords or key phrases are extracted from the plurality of pieces of answer candidate data, wherein in the processing of extracting, key phrases that include a combination of a noun and a particle are extracted on the basis of parts of speech of words included in each of the plurality of pieces of answer candidate data, and in the processing of classifying, the extracted key phrases are classified on the basis of meanings of nouns and types of particles included in the key phrases, wherein the processing further includes determining a verb to be used in the response text to the question from the contents of the plurality of pieces of answer candidate data and creating the response text to the question on the basis of the determined verb, wherein, in the processing of classifying, classification by collecting key phrases that include a combination of a noun and a particle that corresponds to the determined verb is performed for each verb with reference to dictionary information that is capable of specifying a combination of a noun and a particle related to the verb, and in the processing of outputting, the classification result of the key phrases is output together with the created response text.

2. The non-transitory computer-readable recording medium storing the response processing program according to claim 1, for causing the computer to execute processing comprising: receiving selection of any keyword or key phrase from the output classification result of the keywords or key phrases; and retrieving answer candidate data that corresponds to the question on the basis of the received keyword or key phrase and the question.

3. The non-transitory computer-readable recording medium storing the response processing program according to claim 1, for causing the computer to execute processing comprising: receiving input of a response text that corresponds to the classification result of the keywords or key phrases; and registering the received response text and the classification result of the keywords or key phrases in a storage in association with each other.

4. The non-transitory computer-readable recording medium storing the response processing program according to claim 3, wherein in the processing of outputting, the classification result of the keywords or key phrases is output together with the response text that corresponds to the classification result of the keywords or key phrases with reference to the storage.

5. The non-transitory computer-readable recording medium storing the response processing program according to claim 1, wherein in the processing of extracting, key phrases that include a combination of a noun modifier and a modificand are extracted on the basis of parts of speech of words included in each of the plurality of pieces of answer candidate data and a modification relation between the words.

6. The non-transitory computer-readable recording medium storing the response processing program according to claim 1, wherein each of the plurality of pieces of answer candidate data is a combination of question data and answer data.

7. A response processing method comprising:
receiving, a computer, a question from a user input to a terminal;
extracting, in a case where a plurality of pieces of answer candidate data that corresponds to the received question is retrieved, keywords or key phrases from the plurality of pieces of answer candidate data;
classifying the extracted keywords or key phrases on the basis of words included in the keywords or key phrases; and
outputting a classification result of the keywords or key phrases to the terminal in a state selectable by a user, together with a response text to the question,
wherein in the processing of extracting, contents of each of the plurality of pieces of answer candidate data are analyzed on the basis of words and grammatical elements, and keywords or key phrases are extracted from the plurality of pieces of answer candidate data,
wherein in the processing of extracting, key phrases that include a combination of a noun and a particle are extracted on the basis of parts of speech of words included in each of the plurality of pieces of answer candidate data, and in the processing of classifying, the extracted key phrases are classified on the basis of meanings of nouns and types of particles included in the key phrases,
wherein the method further includes determining a verb to be used in the response text to the question from the contents of the plurality of pieces of answer candidate data and creating the response text to the question on the basis of the determined verb,
wherein, in the processing of classifying, classification by collecting key phrases that include a combination of a noun and a particle that corresponds to the determined verb is performed for each verb with reference to dictionary information that is capable of specifying a combination of a noun and a particle related to the verb, and in the processing of outputting, the classification result of the key phrases is output together with the created response text.

8. An information processing apparatus comprising:
a memory; and
a processor coupled to the memory and configured to:
receive, a computer, a question from a user input to a terminal;
extract, in a case where a plurality of pieces of answer candidate data that corresponds to the received question is retrieved, keywords or key phrases from the plurality of pieces of answer candidate data;
classify the extracted keywords or key phrases on the basis of words included in the keywords or key phrases; and
output a classification result of the keywords or key phrases to the terminal in a state selectable by a user, together with a response text to the question,
wherein in a process to extract the keywords or key phrases, contents of each of the plurality of pieces of answer candidate data are analyzed on the basis of words and grammatical elements, and keywords or key phrases are extracted from the plurality of pieces of answer candidate data,
wherein in a process to extract the keywords or key phrases, key phrases that include a combination of a noun and a particle are extracted on the basis of parts of speech of words included in each of the plurality of pieces of answer candidate data, and in the processing of classifying, the extracted key phrases are classified on the basis of meanings of nouns and types of particles included in the key phrases,
wherein the processor further determines a verb to be used in the response text to the question from the contents of the plurality of pieces of answer candidate data and creates the response text to the question on the basis of the determined verb,
wherein, in a process to classify the extracted keywords or key phrases, classification by collecting key phrases that include a combination of a noun and a particle that corresponds to the determined verb is performed for each verb with reference to dictionary information that is capable of specifying a combination of a noun and a particle related to the verb, and in the processing of outputting, the classification result of the key phrases is output together with the created response text.

* * * * *